(12) United States Patent
Tanaka

(10) Patent No.: US 8,446,518 B2
(45) Date of Patent: May 21, 2013

(54) PHOTOGRAPHING APPARATUS AND METHOD TO CONTROL AUXILIARY LIGHT EMISSION

(75) Inventor: Toshiyuki Tanaka, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 452 days.

(21) Appl. No.: 12/624,629

(22) Filed: Nov. 24, 2009

(65) Prior Publication Data

US 2010/0128162 A1 May 27, 2010

(30) Foreign Application Priority Data

Nov. 25, 2008 (JP) ................................. 2008-300243

(51) Int. Cl.
*H04N 5/232* (2006.01)
*G03B 13/00* (2006.01)

(52) U.S. Cl.
USPC .......................................... 348/353; 396/109

(58) Field of Classification Search
USPC .............. 348/207.99, 222.1, 345–357, 370, 348/371; 396/61, 62, 72–152, 155–206
See application file for complete search history.

(56) References Cited

U.S. PATENT DOCUMENTS

| | | | |
|---|---|---|---|
| 2002/0191102 A1* | 12/2002 | Yuyama et al. | 348/370 |
| 2004/0150744 A1* | 8/2004 | Koyanagi | 348/371 |
| 2005/0104993 A1* | 5/2005 | Matsumoto | 348/345 |
| 2005/0179809 A1* | 8/2005 | Yagi et al. | 348/345 |
| 2006/0193619 A1* | 8/2006 | Sasagawa | 396/80 |
| 2007/0092240 A1* | 4/2007 | Tanaka et al. | 396/91 |
| 2007/0133971 A1* | 6/2007 | Itoh | 396/106 |
| 2008/0037976 A1* | 2/2008 | Funaki et al. | 396/108 |
| 2009/0073275 A1* | 3/2009 | Awazu | 348/222.1 |

FOREIGN PATENT DOCUMENTS

| | | |
|---|---|---|
| JP | 10-048510 A | 2/1998 |
| JP | 2005-266784 A | 9/2005 |
| JP | 2005-352252 A | 12/2005 |
| JP | 2006-003441 A | 1/2006 |
| JP | 2006-126611 A | 5/2006 |
| JP | 2006-323080 A | 11/2006 |
| JP | 2007-219029 A | 8/2007 |
| JP | 2007219029 A * | 8/2007 |
| JP | 2008-046231 A | 2/2008 |

OTHER PUBLICATIONS

Office Action established for JP 2008-300243 (Oct. 23, 2012).

* cited by examiner

*Primary Examiner* — Nelson D. Hernández Hernández
*Assistant Examiner* — Dennis Hogue
(74) *Attorney, Agent, or Firm* — Drinker Biddle & Reath LLP

(57) ABSTRACT

A photographing apparatus and method are provided that can reduce power consumption by detecting a high precision focusing position for a predetermined range and controlling light emission according to a driving mode when performing focus control. The photographing apparatus includes: a lens movable in an optical axis direction and that focuses a subject image on an imaging surface; a photoelectric converter that converting the subject image into an electric signal; a focusing position detector for detecting a focusing position of the focus lens when at least one main subject image of the subject images is focused on the imaging surface; a focus control unit for controlling a first drive of the focus lens and a second drive of the focus lens that is different from the first drive; a light emitting unit; and a light emitting control unit for controlling for different light emissions during the first and second drive.

17 Claims, 11 Drawing Sheets

(A)

(B)

PHOTOGRAPHING APPARATUS AND METHOD TO CONTROL AUXILIARY LIGHT EMISSION

CROSS-REFERENCE TO RELATED PATENT APPLICATIONS

This application claims the benefit of Japanese Patent Application No. 2008-300243 filed on Nov. 25, 2008, in the Japanese Intellectual Property Office, the disclosure of which is incorporated herein in its entirety by reference.

BACKGROUND

The present invention relates to a photographing apparatus and method.

Photographing apparatuses, such as digital cameras, may illuminate a subject by emitting a strobe light when capturing a still image. Photographing apparatuses may use a contrast method to perform focus control prior to performing photographing. However, the contrast method increases the likelihood of focusing on a bright side of the subject. Therefore, photographing apparatuses may emit the strobe light to perform focus control prior to performing photographing.

Japanese Patent Application Publication No. 2006-323080 ("JP '080") and Japanese Patent Application Publication No. 2008-46231 ("JP '231") disclose emitting an auxiliary light to a subject by using a light emitting diode (LED) to perform focus control. Also, Japanese Patent Application Publication No. 2005-352252 ("JP '252") discloses using an LED as a main light.

However, photographing apparatuses need a large amount of current to emit a high luminance LED equal to the strobe light in order to obtain the luminance of a subject. Therefore, it is necessary to reduce power consumption as much as possible in relation to emitting an auxiliary light to perform focus control prior to photographing. Also, although the auxiliary light is emitted to perform focus control when a subject is near, it is impossible to obtain contrast information due to a saturated image when a high luminance auxiliary light is emitted. However, when a low luminance auxiliary light is emitted, although it is possible to detect a peak from the contrast information, the precision of the peak is inaccurate due to noise or detection results are inconsistent when the peak is repeatedly detected.

SUMMARY

The present invention provides a photographing apparatus and method which can reduce power consumption by detecting a high precision focusing position within a predetermined range and controlling light emission according to a driving mode when performing focus control.

According to an aspect of the present invention, there is provided a photographing apparatus including: a focus lens for moving in an optical axis direction and focusing a subject image on an imaging surface; a photoelectric conversion device comprising the imaging surface and for converting the subject image formed on the imaging surface into an electric signal; a focusing position detector for detecting a focusing position of the focus lens when at least one main subject image of the subject images is focused on the imaging surface; a focus control unit for controlling a first drive of the focus lens and a second drive of the focus lens that is different from the first drive; a light emitting unit for emitting a light on a subject; and a light emitting control unit for controlling the light emitting unit to have different light emissions during the first drive and the second drive.

The light emitting control unit may control the light emitting unit to have different light emissions according to the drive of the focus lens during the first drive and the second drive of the focus lens.

The focus control unit may move the focus lens to determine the at least one main subject image during the first drive of the focus lens, and move the focus lens within a range corresponding to the main subject image determined in the first drive and detect the focusing position during the second drive of the focus lens.

The photographing apparatus may further include: a contrast value calculating unit for calculating a contrast value in an image signal, that is based on the electric signal, in at least one region of the imaging surface during focus control; and a main subject image determining unit for determining the at least one main subject image based on the contrast value, wherein the focusing position detector can detect a position of the focus lens corresponding to a peak value of the contrast value as the focusing position, and the focus control unit can control the first drive of the focus lens that determines the at least one main subject image and can control the second drive of the focus lens that drives the focus lens within a range including the peak value of the contrast value corresponding to the main subject image determined in the first drive and can detect the focusing position.

The first drive and the second drive of the focus lens may have different driving speeds or different sampling intervals of the image signal used to calculate the contrast value.

The light emitting control unit may control the light emitting unit to have a greater duty ratio of a light emitting pulse in the second drive than in the first drive. The light emitting unit may include a plurality of light emitting diodes (LEDs). The light emitting control unit may control the light emitting unit to have a greater number of LEDs in the second drive than in the first drive. Thus, the total luminance of light emission increases during the second drive compared to the first drive, thereby detecting a peak of a contrast value with high precision.

The light emitting unit may include a plurality of LEDs having different wavelengths, and the light emitting control unit may control the light emitting unit to emit light closer to a main color of the at least one main subject image during the second drive. When the subject image has a color deflection, the light emitting unit may emit light closer to a main color of a subject in order to increase a reflection efficiency of the subject, thereby detecting with high precision a peak of contrast value.

The light emitting control unit may select the plurality of LEDs that emit light in the light emitting unit according to a position of a screen of the at least one main subject image during the second drive. In the second drive, a selected region of the subject has a sufficient quantity of light and thus power consumption is reduced.

The light emitting control unit may control the light emitting unit to emit light on the subject during a photographing operation.

The photographing apparatus may further include: an operating member for generating a first control signal used to control the first drive and the second drive of the focus lens, and further for generating a second control signal used to capture an input subject image by moving the focus lens to the focusing position.

According to another aspect of the present invention, there is provided a photographing method including: performing a first drive on a focus lens and determining a main subject image; emitting light from a light emitting unit that emits a light onto a subject during the first drive of the focus lens; performing a second drive on the focus lens and detecting a focusing position of the focus lens when the main subject image is focused on an imaging surface; and controlling the light emitting unit to have different light emissions during the first drive and the second drive of the focus lens.

The focus lens moves to detect a peak value of a contrast value corresponding to an image signal in the at least one main subject image during the first drive of the focus lens, and the focusing position is determined by moving the focus lens within a range including the peak value of the contrast value during the second drive of the focus lens.

The first drive and the second drive of the focus lens may have different driving speeds or different sampling intervals of the image signal used to calculate the contrast value.

The light emitting unit may have a greater duty ratio of a light emitting pulse in the second drive than in the first drive.

The light emitting unit may include a plurality of LEDs. The second drive may be controlled to have a greater number of LEDs in use than in the first drive.

The light emitting unit may include a plurality of LEDs having different wavelengths, and the light emitting control unit controls the light emitting unit to emit light closer to a main color of the at least one main subject image during the second drive. The light emitting control unit may select the plurality of LEDs that emit light in the light emitting unit according to a position of a screen of the at least one main subject image during the second drive.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Figure 1:
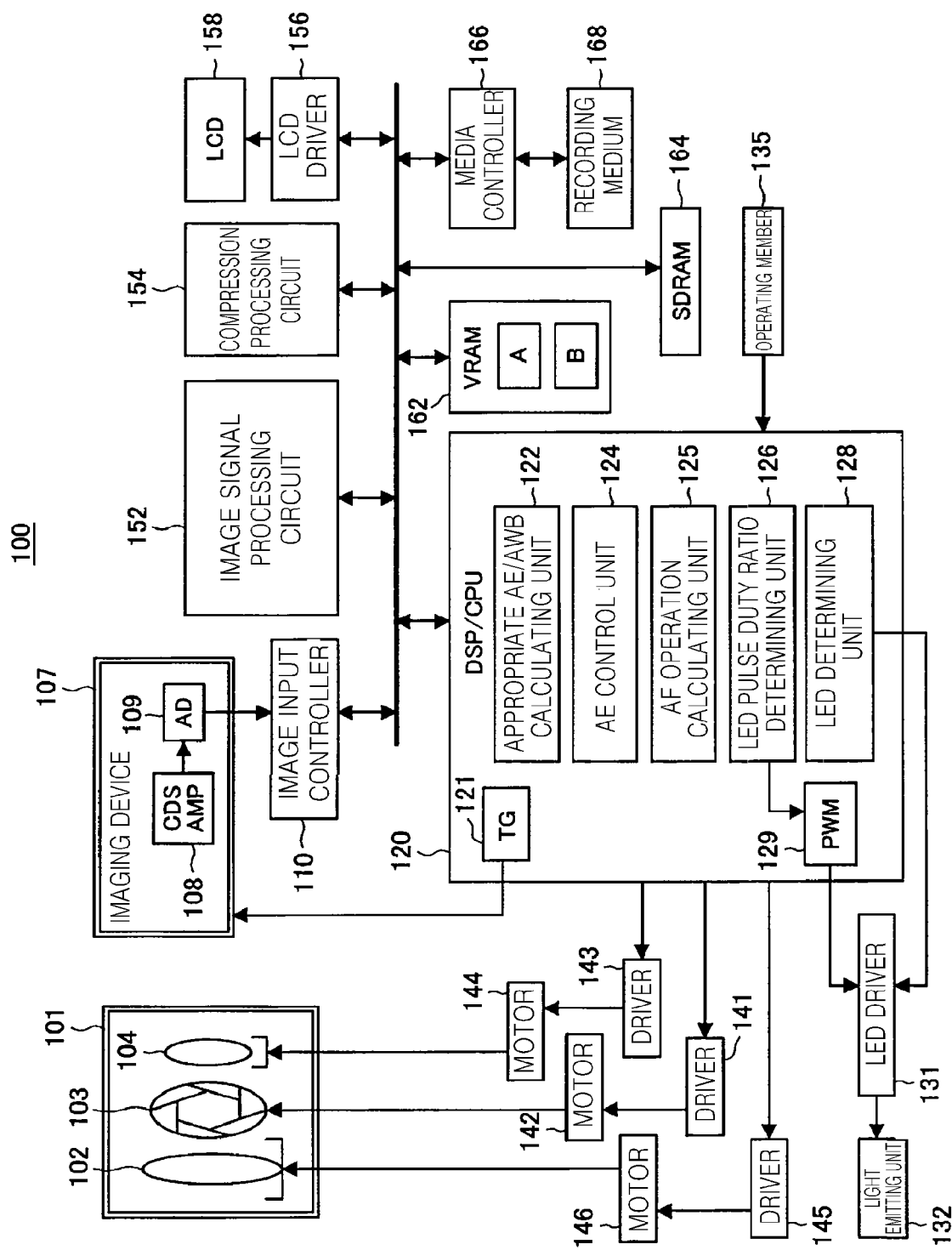
FIG. 1 is a block diagram of a photographing apparatus according to an embodiment of the present invention.

The present invention will now be described more fully with reference to the accompanying drawings, in which exemplary embodiments of the invention are shown. In the drawings, like reference numerals refer to the like elements.

A photographing apparatus 100 according to an embodiment will be described with reference to FIG. 1. FIG. 1 is a block diagram of the photographing apparatus 100.

The photographing apparatus 100 is, for example, a compact digital still camera. However, the imaging apparatus 100 according to the present embodiment is not limited thereto and may be a video camera capable of capturing a still image.

The photographing apparatus 100 includes an optical image forming system 101, an imaging device 107, an image input controller 110, a digital signal processing (DSP)/central processing unit (CPU) 120, a light emitting diode (LED) driver 131, a light emitting unit 132, an operating member 135, drivers 141, 143, and 145, motors 142, 144, and 146, an image signal processing circuit 152, a compression processing circuit 154, a liquid crystal display (LCD) driver 156, an LCD 158, a video RAM (VRAM) 162, a synchronous dynamic random access memory (SDRAM) 164, a media controller 166, and a recording medium 168.

The optical image forming system 101 may be formed of, for example, a zoom lens 102, an aperture 103, and a focus lens 104. The optical image forming system 101 is a system for forming an image on the imaging device 107 from optical information received from outside and allows light from the subject to penetrate the imaging device 107. The zoom lens 102 changes the focal length so as to change a viewing angle and is driven by the motor 142. The aperture 103 adjusts a quantity of transmitted light and is driven by the motor 142. The focus lens 104 moves in an optical axis direction and focuses the subject on an image surface of the imaging device 107. The focus lens 104 is driven by the motor 144. The motors 142, 144, and 146 are driven by respectively receiving driving signals from the drivers 141, 143, and 145.

The imaging device 107 is an example of a photoelectric conversion device and is formed of a plurality of devices which perform photoelectric conversion for converting optical information, resulting from light penetrating the optical image forming system 101 and being incident on the imaging device 107, into an electric signal. Each of the devices generates electric signals according to the light received. The imaging device 107 may use a charge coupled device (CCD) sensor or a complementary metal oxide semiconductor (CMOS) sensor.

In addition, in order to control an exposure time of the imaging device 107, a mechanical shutter (not illustrated) may be applied to the imaging device 107 so as to block light when there is no capturing being performed and to allow light to reach the imaging device 107 only when capturing is being performed. However, the present invention is not limited thereto and an electric shutter (not illustrated) may be applied to the imaging device 107. The mechanical shutter or the electric shutter may be operated by a shutter button switch (operating member 135) connected to the DSP/CPU 120.

Moreover, the imaging device 107 includes a correlated double sampling (CDS)/amplifier (AMP) member 108 and an analog/digital (A/D) converter 109. The CDS/AMP member 108 simultaneously removes low-frequency noise included in the electric signals output from the imaging device 107 and amplifies the electric signal to an arbitrary level. The A/D converter 109 converts the electric signals output from the CDS/AMP member 108 to generate digital signals. The A/D converter 109 outputs the generated digital signals to the image input controller 110.

The image input controller 110 processes the digital signals output from the A/D converter 109 and generates image signals capable of processing an image. The image input controller 110 outputs the generated image signals to, for example, the image signal processing circuit 152. Also, the image input controller 110 controls reading and recording of image data in the SDRAM 164.

The DSP/CPU 120 functions as a processing unit and a control unit under the control of an operational program and controls processing of each element included in the photographing apparatus 100. The DSP/CPU 120 outputs signals to the drivers 141, 143, and 145 and drives the optical image forming system 101 based on, for example, focus control or exposure control. In addition, the DSP/CPU 120 controls each element included in the photographing apparatus 100 based on the signals from the operating member 135. In the present embodiment, one DSP/CPU 120 is disposed. However, a number of CPUs may be included so as to execute commands of a signal system and an operation system in separate CPUs.

As illustrated in FIG. 1, the DSP/CPU 120 includes a timing generator (TG) 121, an appropriate auto exposure (AE)/auto white balance (AWB) calculating unit 122, an AE control unit 124, an auto focus (AF) operation control unit 125, an LED pulse duty ratio determining unit 126, an LED determining unit 128, and a pulse with modulation (PWM) unit 129.

The TG 121 outputs timing signals to the imaging device 107 or the CDS/AMP member 108 and controls the exposure time of each pixel forming the imaging device 107 or controls reading out of electric charge.

The appropriate AE/AWB calculating unit 122 calculates an aperture value or a shutter speed of the aperture 103 based on an AE evaluation value calculated by the image signal processing circuit 152. The appropriate AE/AWB calculating unit 122 calculates, for example, a gain of a three primary color signal based on an AWB evaluation value calculated by the image signal processing circuit 152. The image signal processing circuit 152 calculates the AE evaluation value and the AWB evaluation value based on the luminance value of the image signals.

The AE control unit 124 sends the aperture value calculated by the appropriate AE/AWB calculating unit 122 to the driver 141 as a control signal. The driver 141 generates a driving signal based on the control signal received from the AE control unit 124. The driver 141 transmits the driving signal to the motor 142. The AE control unit 124 controls an AE according to an exposure time, a gain, and a reading mode of the imaging device 107. The gain is used to calculate a contrast value. The reading mode of the imaging device 107 is denoted as a signal processing mode when image data is read from, for example, the imaging device 107, and is a process of adding pixels, when the subject is dark, or directly reading all of the pixels, when the subject is bright.

When the AF operation control unit 125 receives a focus control initiation operating signal, the AF operation control unit 125 generates a control signal for moving the focus lens 104 in one direction and sends the generated control signal to the driver 143. The AF operation control unit 125 is an example of a focus control unit and controls a first drive of the focus lens 104 that determines a main subject image, and a second drive of the focus lens 104 that drives a predetermined range including a peak value of a contrast value corresponding to the main subject image determined in the first drive and detects a focusing position.

The AF operation control unit 125 is an example of a contrast value calculating unit and a focusing position detector that calculates the focusing position of the focus lens 104 based on an AF evaluation value calculated in the image signal processing circuit 152. The AF evaluation value is calculated by the image signal processing circuit 152 based on a luminance value of the image signals. The AF evaluation value is, for example, a contrast value of an image. When the contrast value reaches a peak, it is determined that the subject is focused on the imaging surface of the imaging device 107 (contrast detecting method).

The AF operation control unit 125 is an example of a main subject image determining unit that determines at least one main subject image based on a distance from a subject image. The AF operation control unit 125 sends a focusing position obtained as a result of the calculation to the driver 143 as a control signal. The driver 143 generates a drive signal based on the control signal received from the AF operation control unit 125. The driver 143 sends the drive signal to the motor 144.

The LED pulse duty ratio determining unit 126 determines a duty ratio of a light emitting pulse of the light emitting unit 132 during the first drive and the second drive. The LED determining unit 128 determines an LED of the light emitting unit 132 during the first drive and the second drive. That is, the PWM 129 changes a duty ratio of a pulse wave. The PWM 129 sends a signal obtained from the modulation to the LED driver 131.

The LED driver 131 generates a drive signal based on the signal received from the PWM 129 and sends the drive signal to the light emitting unit 132. The light emitting unit 132 includes a plurality of solid LEDs and emits a light to a subject to perform focus control prior to photographing.

The operating member 135 may include a 4-direction key, a power switch, mode dials, and a shutter button disposed in the imaging apparatus 100, as well as any other user interface elements. The operating member 135 transmits the operation signal based on operations performed by a user to the DSP/CPU 120. For example, the shutter button may be half-pressed, fully pressed, or released by the user. When the shutter button is half-pressed (S1 operation), the focus control initiation operating signal is output and the shutter button is released to cancel focus control. Also, when the shutter button is fully pressed (S2 operation), a capturing initiation control signal is output.

The image signal processing circuit 152 receives the image signals from the image input controller 110 and generates image processed image signals based on a WB control value, a γ value, and an outline sharpening control value. The image signal processing circuit 152 calculates the AE evaluation value and the AF evaluation value based on the image signals, and respectively sends the AE evaluation value, the AWB evaluation value, and the AF evaluation value to the DSP/CPU 120.

The compression processing circuit 154 receives the image signals and compresses the image signals using a compression method such as JPEG compression or Lempel-Ziv-Welch (LZW) compression. The compression processing circuit 154 outputs image data generated by compression processing to, for example, the media controller 166.

The LCD driver 156 receives the image data from, for example, the VRAM 162, and displays an image on the LCD 158. The LCD 158 is disposed in a body of the imaging apparatus 100. The image displayed on the LCD 158 may include, for example, an image read from the VRAM 162 (live view display) before being captured, various setting screens of the imaging apparatus 100, or an image that was captured and recorded. In the present embodiment, the LCD 158 is disposed as a display unit and the LCD driver 156 is disposed as a display operating member. However, the present invention is not limited thereto and the display unit and the display operating member of the present invention may be respectively an organic EL display and its display operating member or any other form of display.

The VRAM 162 is a memory for displaying an image and has various channels. The VRAM 162 may simultaneously perform input of the image data for displaying an image and output of the image data to the LCD driver 156. The resolution or the maximum number of colors of the LCD 158 is dependent upon the capacity of the VRAM 162.

The SDRAM 164 is an example of a storage unit, and temporarily stores image data of captured images. The SDRAM 164 has sufficient memory capacity to store image data of various images. Also, the SDRAM 164 sequentially maintains the image signals while performing focus control so as to output the image signals. In addition, the SDRAM 164 stores an operational program of the DSP/CPU 120. Reading and recording of the images in the SDRAM 164 are controlled by the image input controller 110.

The media controller 166 controls recording of the image data to the recording medium 168 or reading of the image data or setting information recorded to the recording medium 168. The recording medium 168 may be, for example, an optical disc (CD, DVD, or blue ray disc), a magneto-optical disc, a magnetic disc, or a semiconductor memory medium, and records the captured image data. The media controller 166 and the recording medium 168 may be removed from or attached to the photographing apparatus 100.

A series of processing operations in the photographing apparatus 100 may be performed in hardware or software by programs on a computer.

Figure 2:
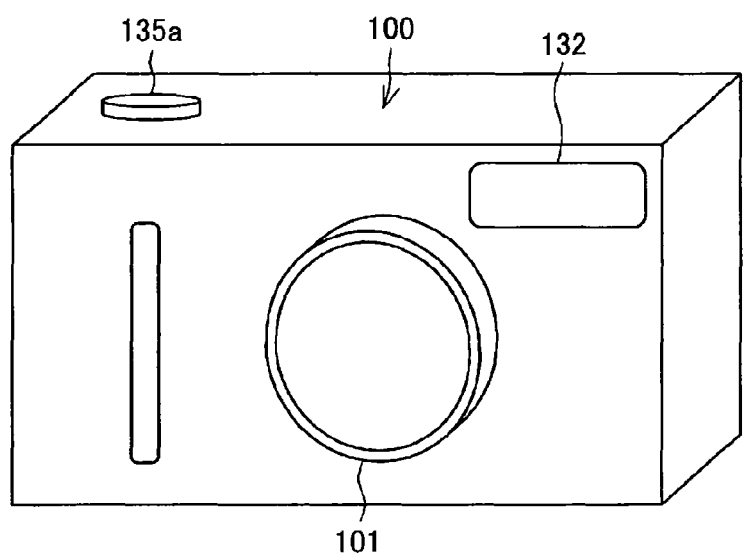
FIG. 2 is a perspective view of the photographing apparatus of FIG. 1 according to an embodiment of the present invention.
Figure 3:
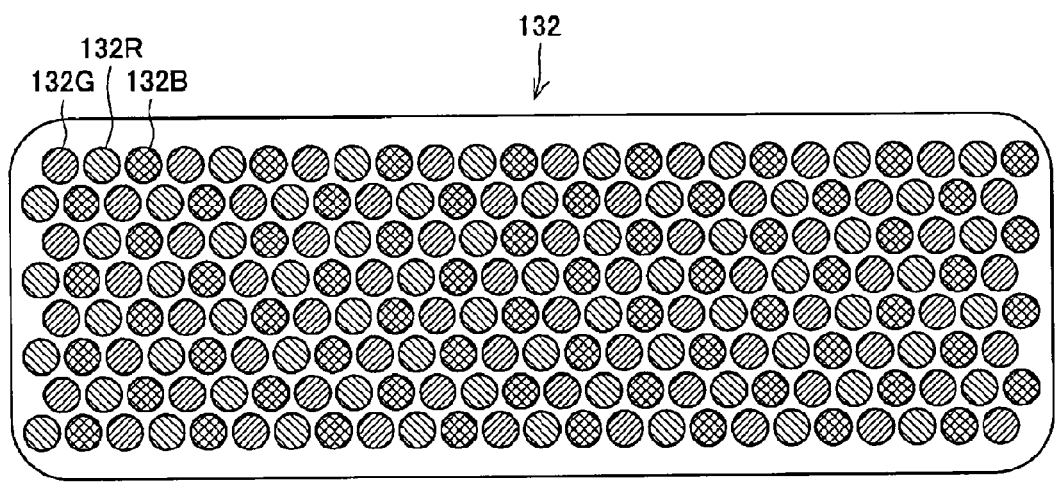
FIG. 3 is a front view of a light emitting unit of the photographing apparatus of FIG. 1, according to an embodiment of the present invention.

The structure of the photographing apparatus 100 of the present embodiment will now be described with reference to FIGS. 2 and 3. FIG. 2 is a perspective view of the photographing apparatus 100 according to an embodiment of the present invention. FIG. 3 is a front view of the light emitting unit 132 of the photographing apparatus 100, according to an embodiment of the present invention.

Referring to FIG. 2, the photographing apparatus 100 is, for example, a compact camera, and includes the optical image forming system 101, the light emitting unit 132, and a shutter button 135a of the operating member 135. The photographing apparatus 100 is not limited thereto and may include other elements. The positions of the elements included in the photographing apparatus 100 are not limited thereto. Furthermore, although the light emitting unit 132 is integrally formed with the photographing apparatus 100 in the present embodiment, the present invention is not limited thereto. For example, the light emitting unit 132 may be separated from the photographing apparatus 100 and may be detached from the photographing apparatus 100.

Referring to FIG. 3, the light emitting unit 132 includes a plurality of LEDs having different wavelengths, for example, a plurality of red LEDs (crosshatch LEDs) 132R, green LEDs 132G, and blue LEDs 132B. The red LEDs (crosshatch LEDs) 132R, green LEDs 132G, and blue LEDs 132B may be individually turned on. Although the red LEDs (crosshatch LEDs) 132R, green LEDs 132G, and blue LEDs 132B may be continuously turned on, the red LEDs (crosshatch LEDs) 132R, green LEDs 132G, and blue LEDs 132B may be turned on according to an on-off switching control (pulse light emitting) at high speed in order to maintain durability. The light emitting unit 132 may further include an LED of a color other than red, green, and blue.

A focus control operation of a contrast method, according to an embodiment of the present invention, will now be described.

Figures 4, 5:
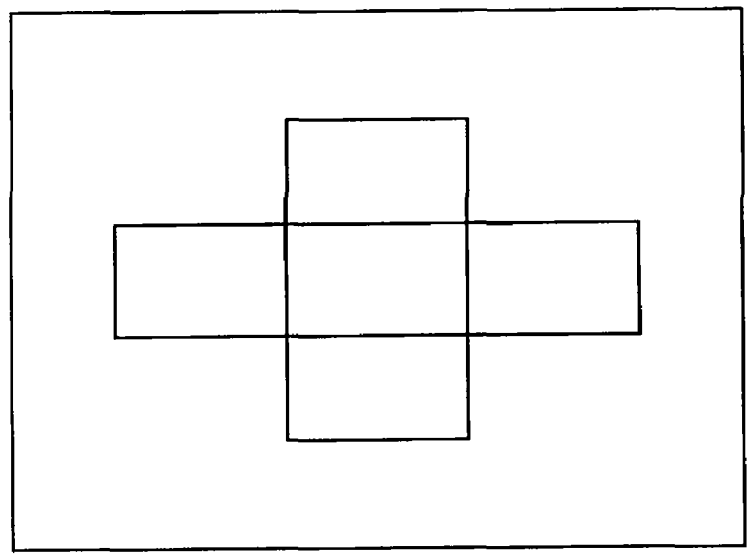
FIG. 4 is a pictorial diagram for explaining a screen and AF regions, according to an embodiment of the present invention.
FIG. 5 is a pictorial diagram for explaining a Laplacian filter.

The photographing apparatus 100 moves the focus lens 104, selects a part of an image formed in the imaging device 107, and detects a contrast of a subject. The selected part of the image is divided into a plurality of regions at a center of a screen. FIG. 4 is a diagram for explaining a screen and AF regions. Referring to FIG. 4, the AF regions include five regions in the center of the screen. A contrast value of each region is obtained by accumulating differences between adjacent pixels of each region or absolute values of a Laplacian filter. FIG. 5 is a diagram for explaining the Laplacian filter.

A high speed scanning operation (an example of a first drive) and a low speed scanning operation (an example of a second drive) performed during the focus control operation will now be described.

Figure 6:
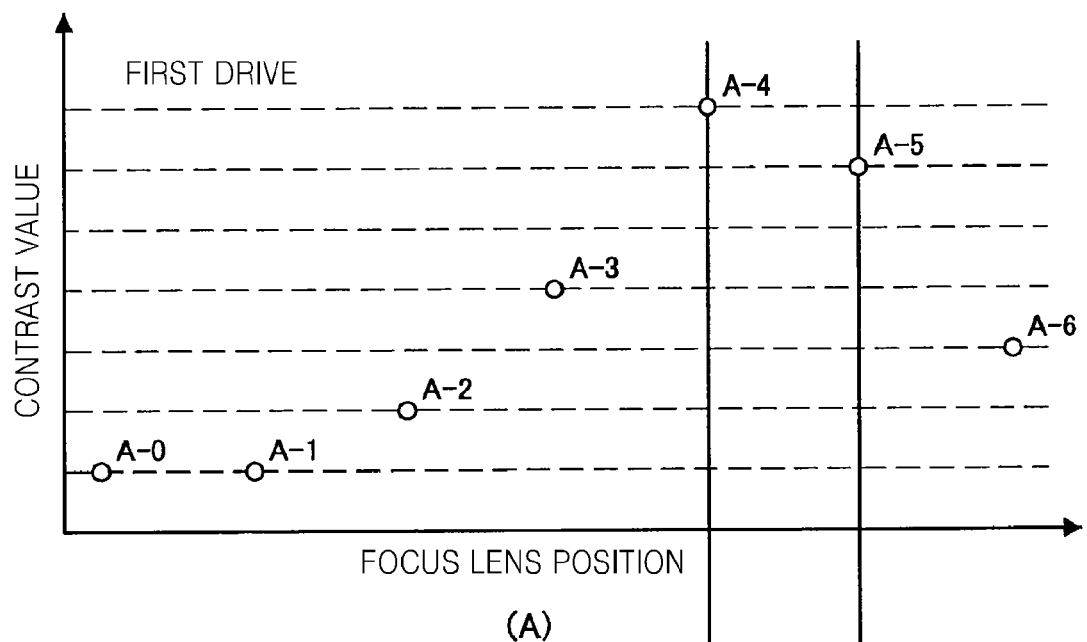
FIG. 6 is a combined graph showing the relationship between the position of a focus lens and a contrast value of a subject, according to embodiments of the present invention.
Figure 6:
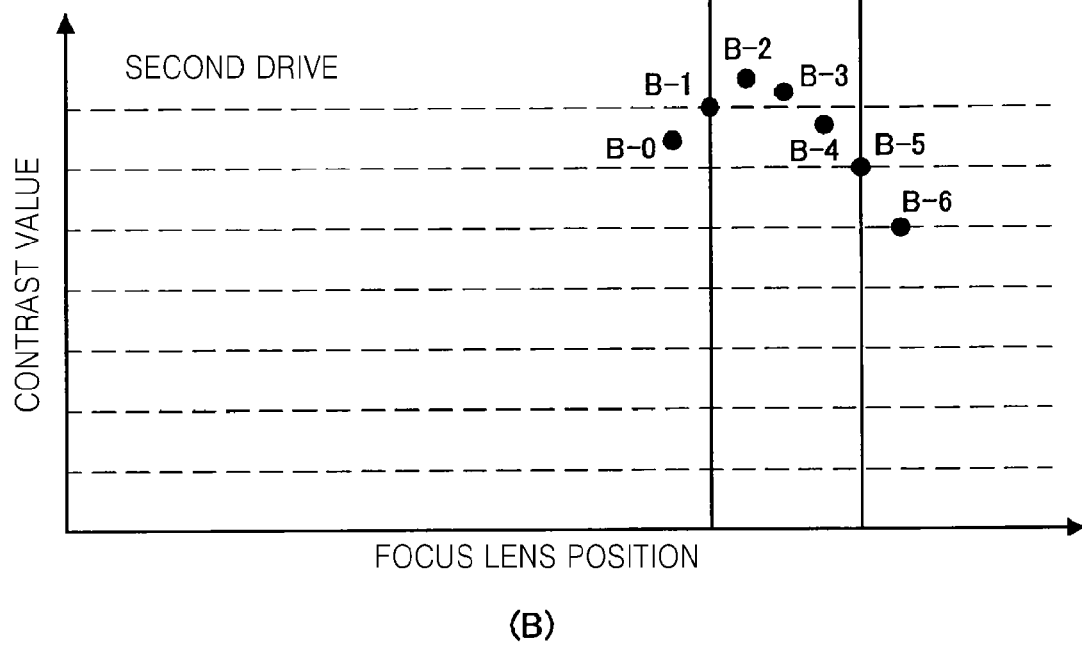
Figure 7:
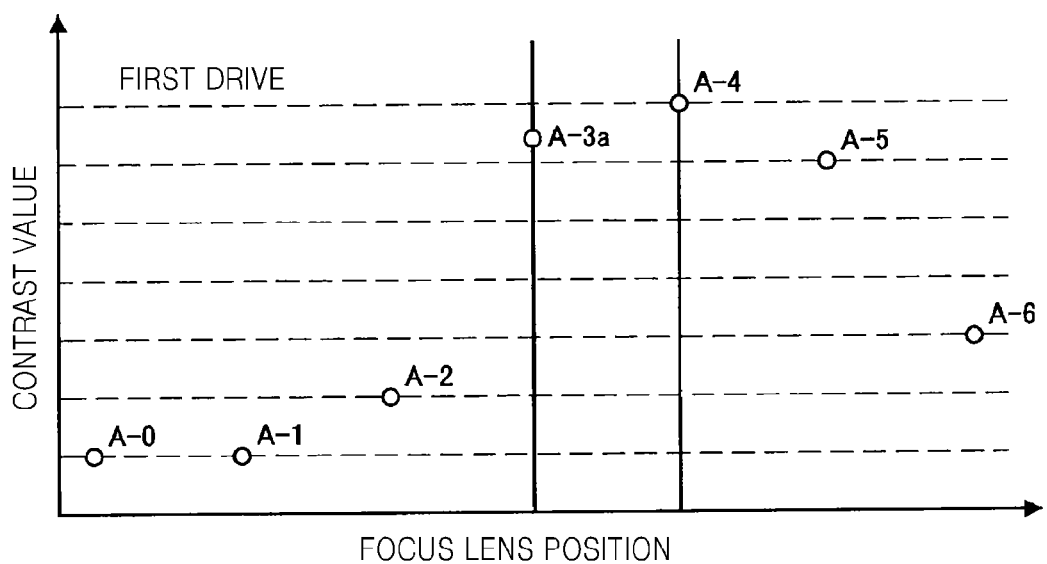
FIG. 7 is a graph showing the relationship between the position of a focus lens and a contrast value of a subject, according to another embodiment of the present invention.

FIGS. 6 (A), (B), and 7 are graphs showing the relationship between the position of the focus lens 104 and a contrast value (a filtered output value) of a subject, according to embodiments of the present invention. Referring to FIGS. 6 (A), (B), and 7, a result obtained by accumulating output values obtained by multiplying the Laplacian filter by each of pixels included in the AF regions is plotted. Referring to FIGS. 6(A) and 7, the graphs show contrast values obtained from the high speed scanning operation. Referring to FIG. 6(B), the graph shows contrast values obtained from the low speed scanning operation. A distinctive contrast of an image increases an output absolute value of the Laplacian filter. The position of the focus lens 104 (corresponding to the position of the subject) where a maximum output value is obtained is detected by moving the focus lens 104 in order to detect a focusing position.

A high precision output value can be obtained by reducing a unit movement amount of the focus lens 104 and thus it is easy to detect the position of a peak. However, the number of samplings increases, resulting in an increase in time taken to perform focus control. It is impossible to detect the position of the peak if the focus lens 104 does not pass through a position where the output value reaches a peak, which is the feature of the focus control of the contrast method. Therefore, an operation of moving the focus lens 104 that passes through the position of the peak back is needed. An increase in the time taken to perform focus control causes an increase in the number of occurrences of a handshake and indicates that a subject is out of the AF regions, and thus the focus control operation may be completed in a short time. Thus, two scanning operation steps are performed in the present embodiment.

The high speed scanning operation (the first drive) of moving the focus lens 104 is performed at high speed in a wide sampling interval. An approximate position of the peak can be detected. Sampling intervals are too sparse to accurately detect the position of the peak. Although an interpolation calculation is used, contrast values obtained by performing the high speed scanning operation have low precision and thus a focusing position is not accurately detected.

After it is detected that the focus lens 104 passes through the peak during the high speed scanning operation, the low speed scanning operation (the second drive) is performed near (a region including the peak) of the position of the peak. The low speed scanning operation makes it possible to determine the relationship between the position of the focus lens 104 and contrast values finally obtained through a high precision interpolation calculation by performing the low speed scanning operation. The focus lens 104 is moved to the position of the peak of contrast values obtained by performing the high precision interpolation calculation and thus an AF operation is completed.

An operation of detecting the position of a peak will now be described.

When a contrast value obtained from an output value in a first position of the focus lens 104 is continuously reduced twice, the position of the peak can be detected in: (a) between a second position of the focus lens before one from the first position and a third position of the focus lens 104 before two from the first position, or (b) between the third position and a fourth position of the focus lens 104 before three from the first position. (a) and (b) can be identified according to whether contrast values in positions of the focus lens 104 before one and three from the first position are greater or smaller. For example, if the contrast value in the second position of the focus lens 104 before one from the first position is greater than the contrast value in fourth position of the focus lens 104 before three from the first position, it is determined as (a). If the contrast value the second position is smaller than the contrast value in the fourth position, it is determined as (b). In this regard, a twice continuous reduction is used to prevent an erroneous detection due to an instable factor, such as a noise or a handshake.

Referring to FIGS. 6(A) and 7, point A-6 is where a contrast value is continuously reduced twice during the high speed scanning operation. The peak of the contrast value is positioned in (a) between the second position of the focus lens 104 (point A-5) before one from the first position of the focus lens 104 point A-6 and the third position of the focus lens 104 (point A-4) before two from the first position of the focus lens 104 point A-6 or in (b) between (point A-4) before two from point A-6 and the fourth position of the focus lens 104 (points A-3 and A-3a) before three from point A-6. (a) and (b) can be identified according to whether contrast values in the second position and the fourth position are greater or smaller. Thus, (a) and (b) are identified according to whether the contrast value (point A-5) before one from point A-6 is greater or smaller than the contrast values (points A-3 and A-3a) before three from point A-6.

For example, referring to FIG. 6(A), since the contrast value (point A-5) before one from point A-6 is greater than the contrast value (point A-3) before three from point A-6, it is determined that the position of the peak is between the contrast value (point A-5) before one from point A-6 and the contrast value (point A-4) before two from point A-6. However, since the contrast value (point A-3a) before three from point A-6 is greater than the contrast value (point A-5) before one from point A-6, it is determined that the position of the peak is between the contrast value (point A-4) before two from point A-6 and the contrast value (point A-3a) before three from point A-6.

A two step operation of the focus lens 104 will now be described.

A two step scanning operation may be performed in a particular direction in order to prevent positions from being mismatched to each other due to a backlash of a gear of a lens driving system. Referring to FIGS. 6(A) and 6(B), the focus lens 104 is moved in the same direction. The first drive starts with point A-0 and ends with point A-6. The focus lens 104 is moved back to point B-0 and then the second drive starts. Referring to FIG. 6(B), a contrast value is continuously reduced twice in point B-3 and point B-4 and thus the second drive ends with point B-4 (point B-5 and point B-6 are plotted for reference). Since the peak is predicted to be positioned between point B-2 and point B-3, information about the position of the focus lens 104 in contrast values point B-1 and point B-4 before and after point B-2 and point B-3 is used to calculate a focusing position by interpolation calculation. The interpolation calculation determines an intersection point between a segment line between point B-1 and B-2 and a segment line between point B-3 and B-4 as the position of the peak. The peak position may be detected by spline interpolation by using information about positions of point B-1 through point B-4.

The focus lens 104 is moved to the position calculated by the interpolation, the AF operation is completed, and a photographing operation is possible.

Figure 8:
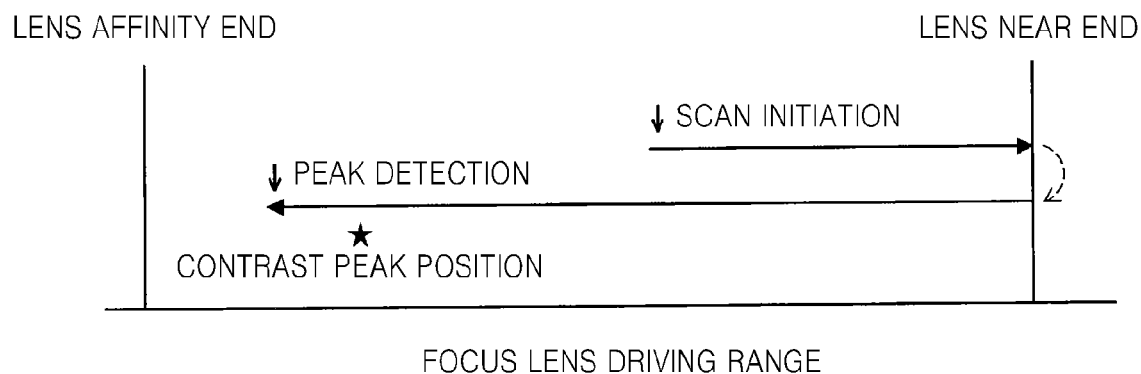
FIG. 8 is a sequence chart for explaining a driving range and a driving direction of a focus lens, according to an embodiment of the present invention.

In more detail, the first drive is initiated during a driving range of the focus lens 104 as shown in FIG. 8. FIG. 8 is a diagram for explaining a driving range and a driving direction of the focus lens 104, according to an embodiment of the present invention. When a scanning operation is initiated, a peak is not detected in a direction that the focus lens 104 moves in the first drive to an end portion (a close end of the focus lens 104) of the driving range of the focus lens 104. In this case, the focus lens 104 is moved to a lens end and then the scanning operation may be performed in an opposite direction (in a direction of an infinity end of the focus lens 104) as the first drive. The above defect of the backlash is due to sparse sampling intervals.

As described above, the time necessary for the first drive is inconsistent. Thus, a quantity of power consumed to light an AF auxiliary light may be erroneously predicted. The AF auxiliary light is frequently used to light the light emitting unit 132 after performing focus control. Thus, an excessive consumption of battery during the focus control may reduce a quantity of light. The first drive requires a minimum quantity of light within a range where a peak is detected during the focus control.

When a distance between the photographing apparatus 100 and a subject is short and a quantity of the AF auxiliary light is great, if a luminance is saturated, it is impossible to obtain contrast information. Thus, the first drive is needed to set a luminance value that is not saturated at a minimum photographing distance. The second drive enables prediction of a maximum scanning time and takes less time than the first drive. Thus, the second drive has a high degree of freedom with regard to setting of a quantity of the AF auxiliary light.

Figure 10A:
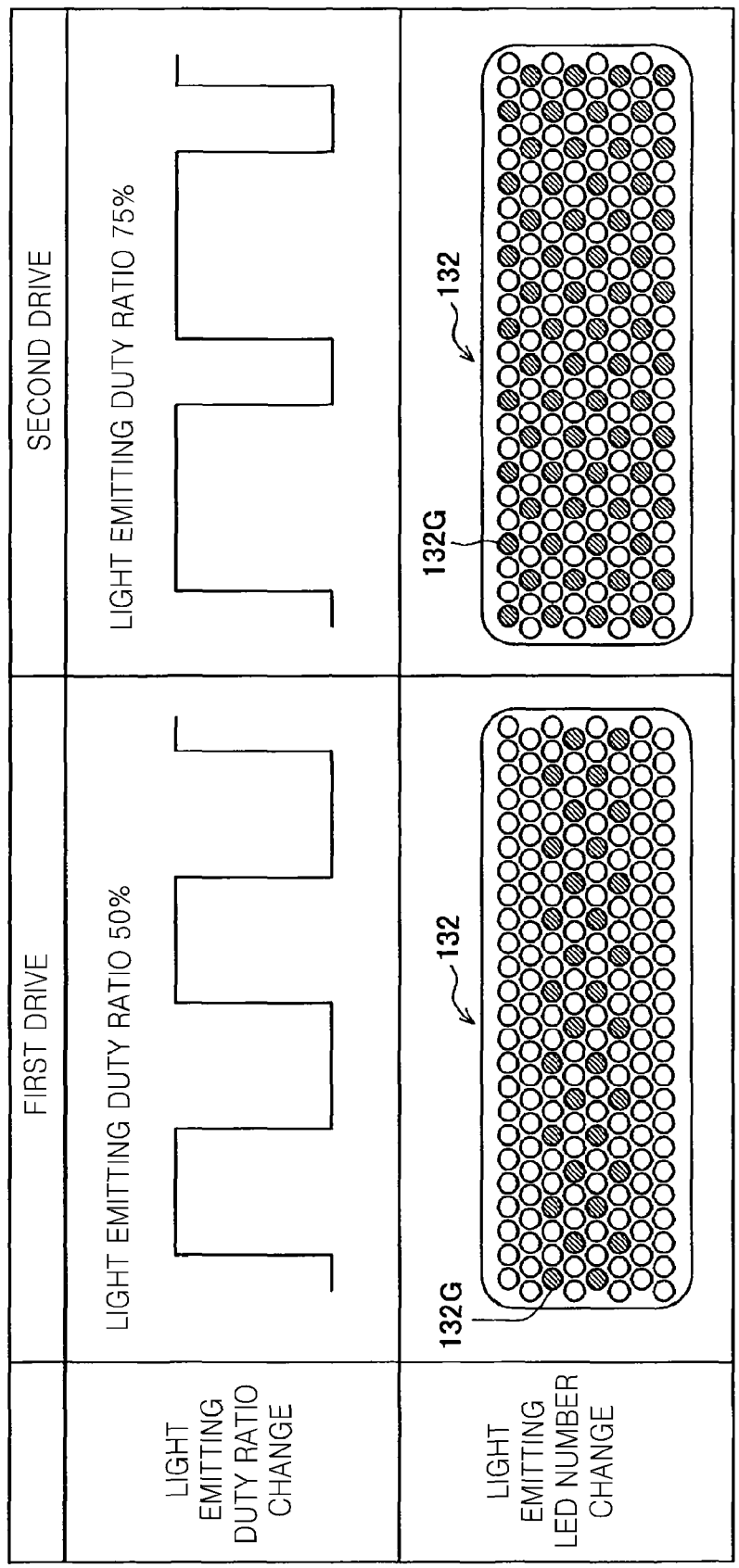
FIG. 10A is a pictorial diagram for explaining light emitting control of a light emitting unit in a first drive and a second drive, according to an embodiment of the present invention.
Figure 10B:
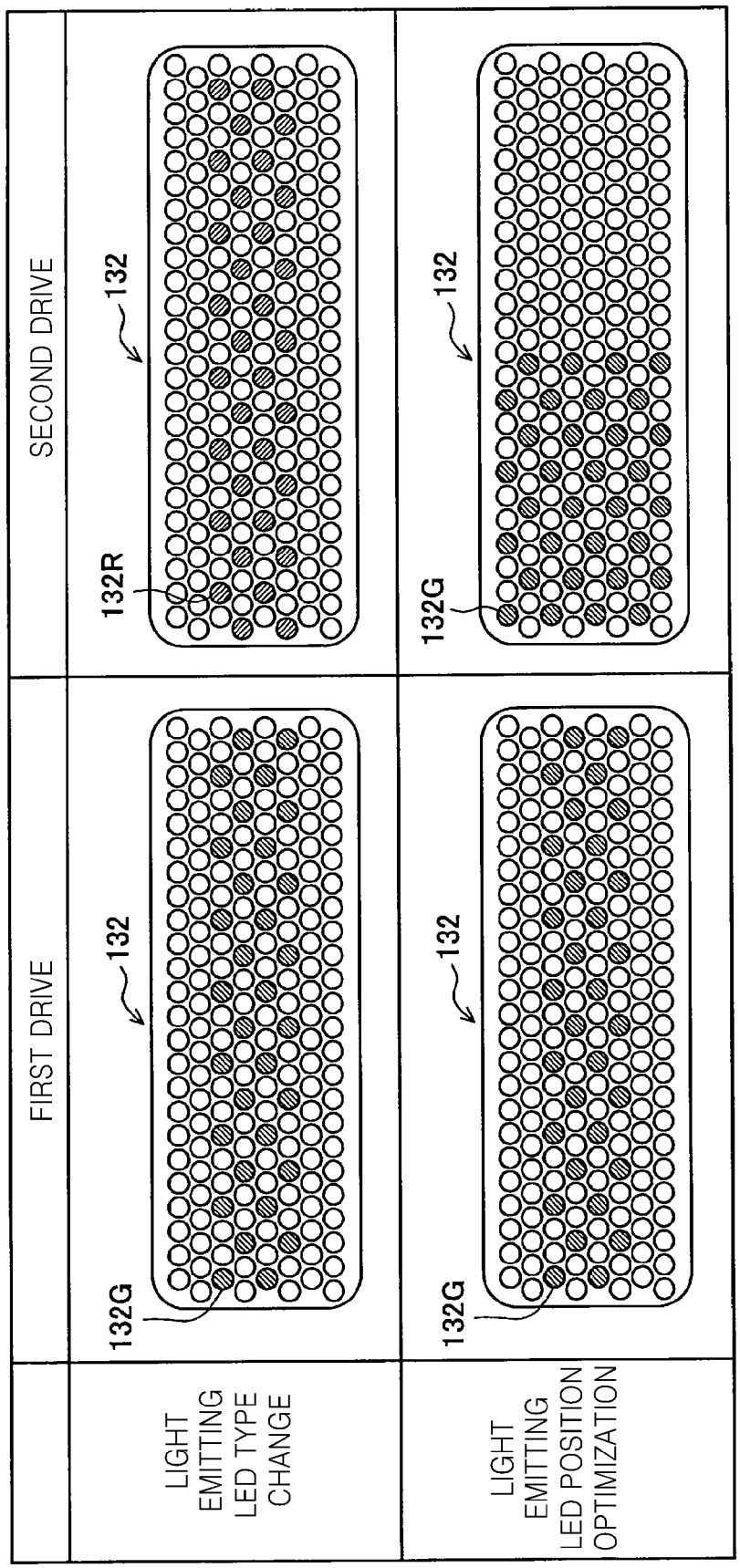
FIG. 10B is a pictorial diagram for explaining light emitting control of a light emitting unit in a first drive and a second drive, according to another embodiment of the present invention.

The light emitting control of the light emitting unit 132 in the first drive and the second drive will now be described with reference to FIGS. 10A and 10B. FIGS. 10A and 10B are pictorial diagrams for explaining light emitting control of a light emitting unit in a first drive and a second drive, according to embodiments of the present invention.

In the first drive and the second drive, the red LEDs 132R, the green LEDs 132G, and the blue LEDs 132B of the light emitting unit 132 are controlled to have different duty ratios of light emitting pulses. For example, the duty ratio of light emitting pulses is set to be greater in the second drive than in the first drive. For example, referring to FIG. 10A, the duty ratio of light emitting pulses is 50% in the first drive, and the duty ratio of light emitting pulses is 75% in the second drive.

Thus, the total luminance is higher in the second drive than in the first drive, thereby detecting a high precision peak of contrast value. An AE evaluation obtained in the first drive is used to determine a value of the duty ratio of light emitting pulses in the second drive. A lighting time of light emitting pulses of each of the red LEDs 132R, the green LEDs 132G, and the blue LEDs 132B is set to be short compared to an exposure time during focus control.

The number of the red LEDs 132R, the green LEDs 132G, and the blue LEDs 132B of the light emitting unit 132 that emit light is controlled to be different in the first drive from the second drive. For example, the number of the red LEDs 132R, the green LEDs 132G, and the blue LEDs 132B of the light emitting unit 132 that emit light is set to be greater in the second drive than in the first drive. For example, referring to FIG. 10A, the number of the green LEDs 132G that emit light is 50% in the first drive, and the number of the green LEDs 132G that emit light is 75% in the second drive. Thus, the total luminance is higher in the second drive than in the first drive, thereby detecting a high precision peak of contrast value. For example, an AE evaluation obtained in the first drive is used to determine a value of the number of the LEDs 132R, 132G, and 132B that emit light in the second drive. Referring to FIG. 10A, the green LEDs 132G emit light during focus control and the red LEDs 132R and the blue LEDs 132B do not emit light, but the present invention is not limited thereto. For example, the red LEDs 132R, green LEDs 132G, and blue LEDs 132B may emit light of another color or of a combination of two colors or three colors.

In the first drive and the second drive, the red LEDs 132R, the green LEDs 132G, and the blue LEDs 132B of the light emitting unit 132 are controlled to have different light emitting colors. For example, the green LEDs 132G are set to emit light of a representative color in the first drive, and an LED closer to a main color of a main subject image is set to emit light in the second drive.

For example, referring to FIG. 10B, the green LEDs 132G emit light in the first drive. An AWB evaluation value obtained in the first drive is used to emit the red LEDs 132R in the second drive when a subject image includes many red subjects. Likewise, when the subject image has a color reflection, the light emitting unit 132 emits light closer to a main color of a subject in order to increase a reflection efficiency of the subject, thereby detecting a high precision peak of contrast value.

The AWB evaluation value obtained in the first drive is used to determine a light emitting color of the red LEDs 132R, the green LEDs 132G, and the blue LEDs 132B in the second drive.

Referring to FIG. 10B, light of a single color, i.e., the red LEDs 132R, is emitted in the second drive but the present invention is not limited thereto. For example, according to a main color of a main subject image, the red LEDs 132R, green LEDs 132G, and blue LEDs 132B may emit light of another color or a combination of two colors or three colors. Light having a single color and all RGB colors as well may be emitted in the first drive in order to obtain the AWB evaluation value in the first drive. When light of all RGB colors are emitted in the first drive, the number of red LEDs 132R, the green LEDs 132G, and the blue LEDs 132B that emit light is reduced in the first drive compared to the second drive and thus a quantity of light is limited, thereby reducing power consumption while obtaining a luminance necessary for the first drive.

In the first drive and the second drive, the red LEDs 132R, the green LEDs 132G, and the blue LEDs 132B of the light emitting unit 132 are controlled to have different light emitting positions. For example, the red LEDs 132R, the green LEDs 132G, and the blue LEDs 132B emit light to equally irradiate a screen (an angle of image) in the first drive, and the red LEDs 132R, the green LEDs 132G, and the blue LEDs 132B selectively emit light according to the position of the screen of a main subject image in the second drive.

During focus control, contrast information is detected from a plurality of AF regions and the detected pieces of contrast information are compared to each other, and a finally focused main subject image is determined. An AF region including the main subject image is selected to move the focus lens 104 to a focusing position corresponding to a peak of contrast values. In this regard, the main subject image, i.e., the AF region, is selected by using a selection algorithm that prioritizes a subject closer to the photographing apparatus 100 or a midpoint between the photographing apparatus 100 and the subject.

Figure 9:
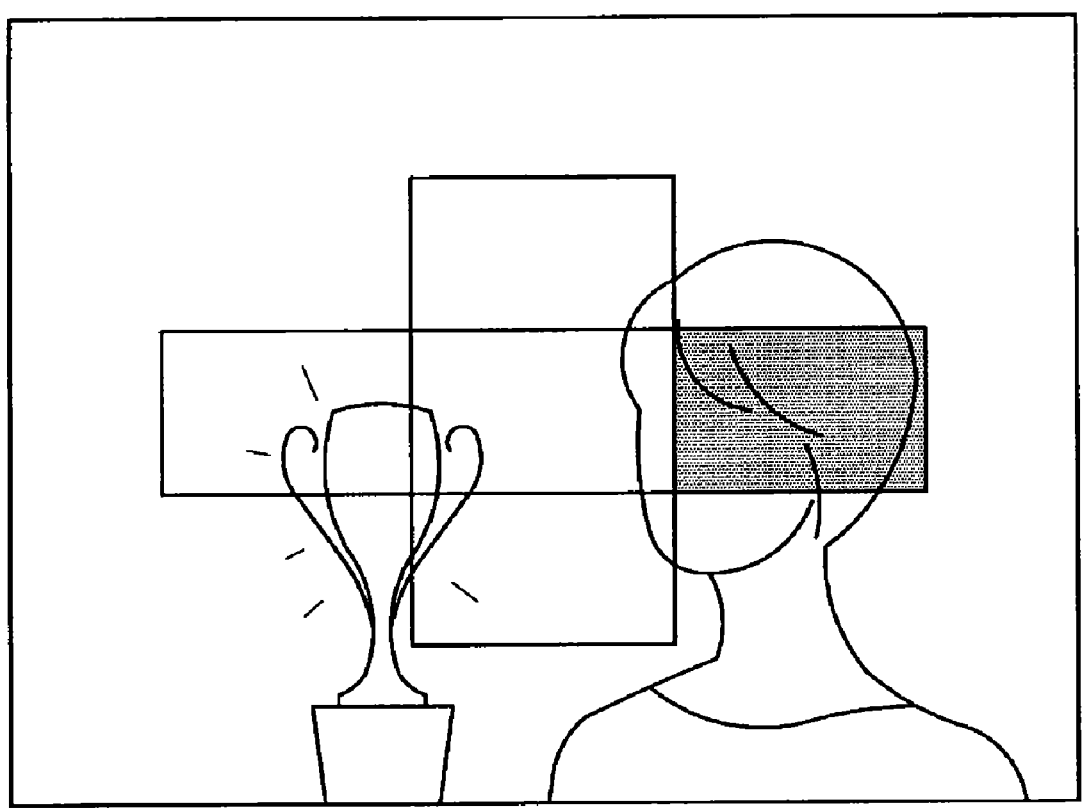
FIG. 9 is a pictorial diagram of a screen captured by a photographing apparatus, according to an embodiment of the present invention.

The selection of the main subject image, i.e., the selection of the AF region, will now be described with reference to FIG. 9. FIG. 9 is a diagram of a screen captured by the photographing apparatus 100, according to an embodiment of the present invention. Five AF regions are at the center of the screen and a subject image, such as a person, is shown.

Referring to FIG. 9, the person is located on the right of the view from the photographing apparatus 100. For example, a person on the right is selected by using a selection algorithm that prioritizes a subject closer to the photographing apparatus 100. In this regard, an AF region at a far right is selected from the five AF regions.

In this case, the light emitting unit 132 that illuminates as an AF auxiliary light illuminates a whole view in the first drive, but the light emitting unit 132 that illuminates to the right is selected in the second drive. Referring to FIG. 10B, the green LEDs 132G of the light emitting unit 132 are equally emitted in a horizontal direction in the first drive. The right green LEDs 132G of the light emitting unit 132 are emitted in the second drive according to the position of the subject image based on an AF evaluation value obtained in the first drive.

In the second drive, a selected AF region has a sufficient quantity of light and thus an auxiliary light regarding a left side of the screen is not needed. Thus, the light emitting unit 132 that irradiates a right side of the screen is selected, thereby reducing power consumption. Referring to FIG. 10B, the green LEDs 132G emit light and the red LEDs 132R and the blue LEDs 132B do not emit any light during the focus control, but the present invention is not limited thereto. For example, the red LEDs 132R, green LEDs 132G, and blue LEDs 132B may be emitted by another color or a combination of two colors or three colors.

Figure 11A:
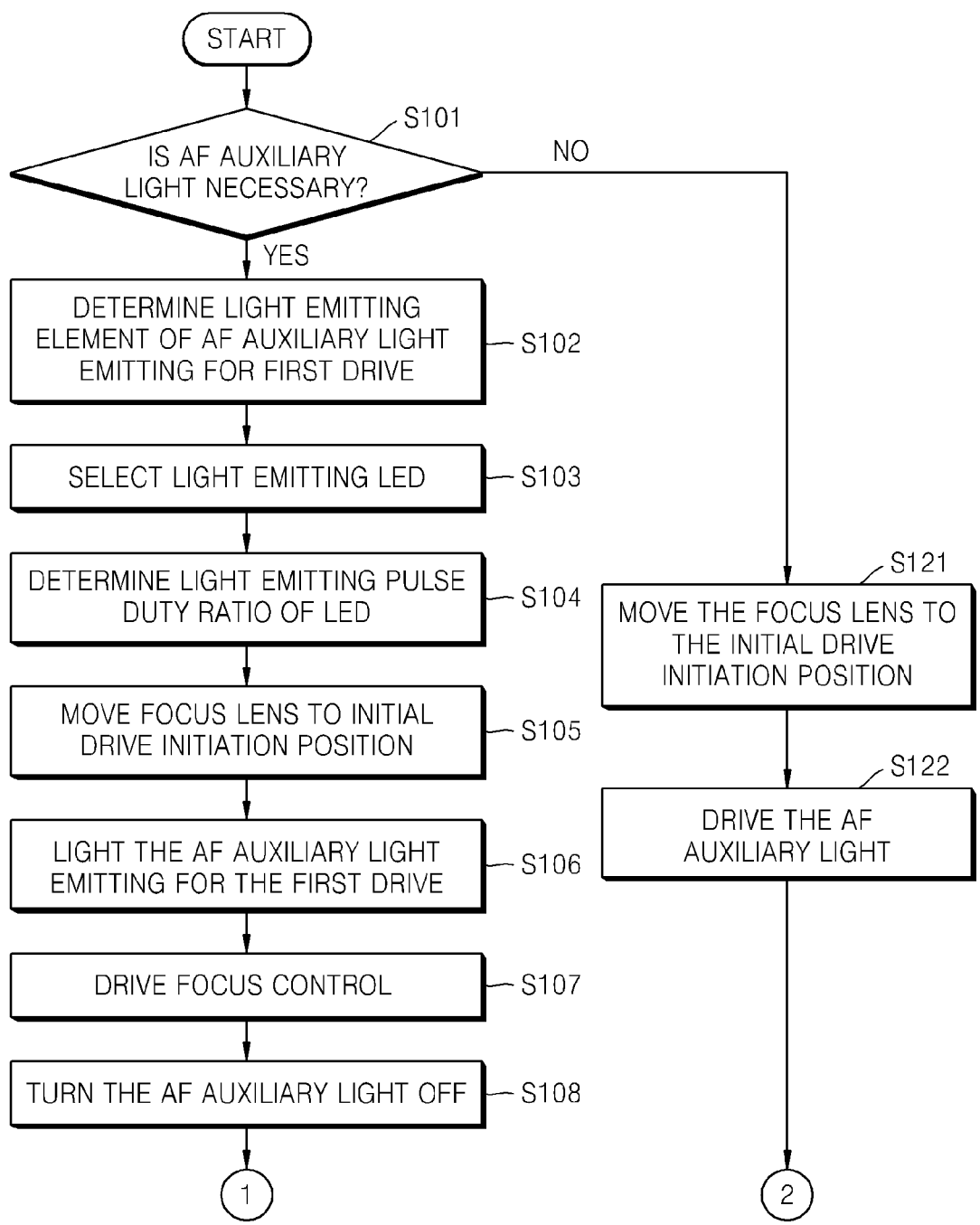
FIG. 11A is a flowchart illustrating an operation performed in a photographing apparatus, according to an embodiment of the present invention.
Figure 11B:
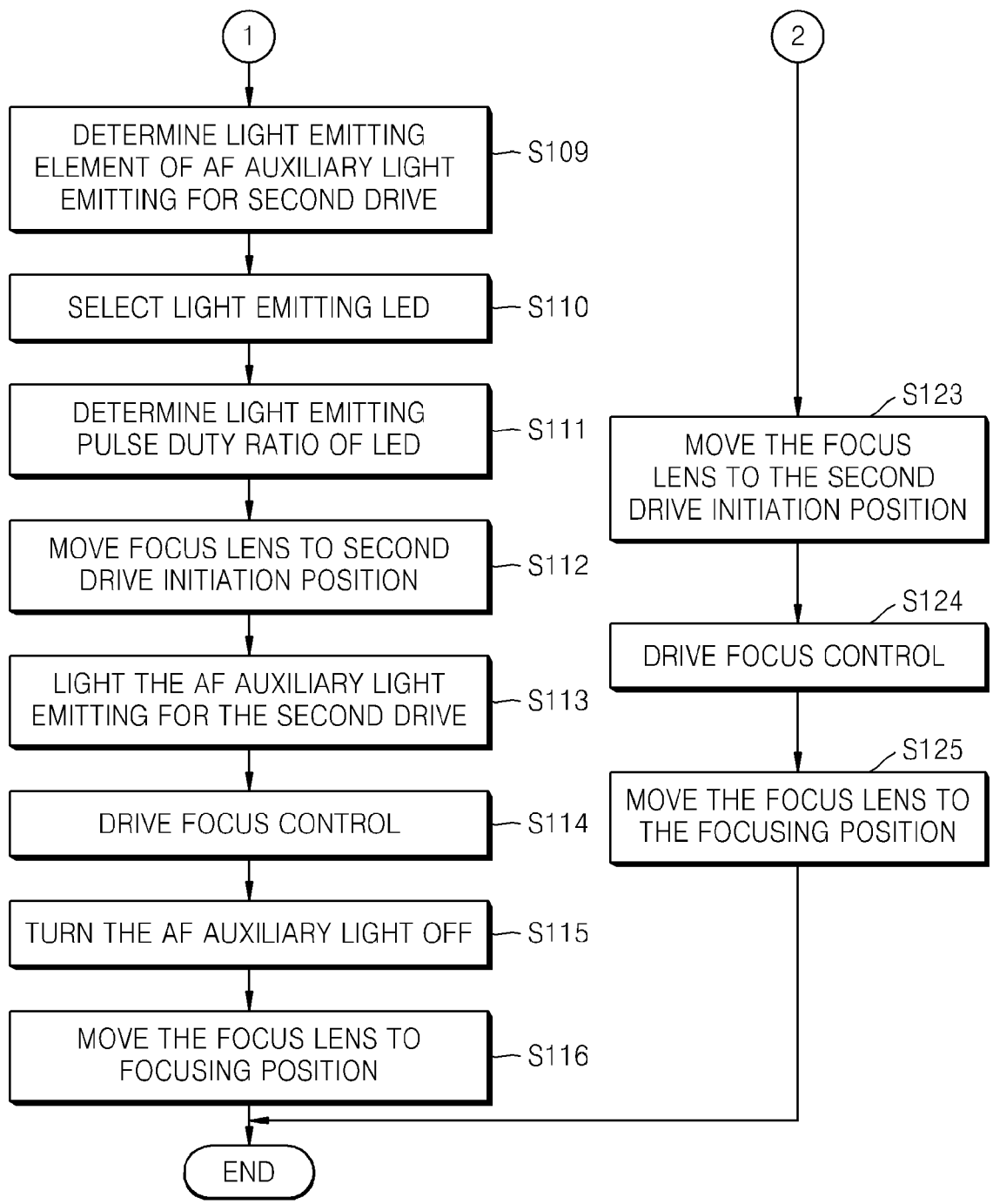
FIG. 11B is a flowchart illustrating an operation performed in a photographing apparatus, according to another embodiment of the present invention.

A focus control operation of the photographing apparatus 100 using a contrast method, according to an embodiment of the present invention will now be described with reference to FIGS. 11A and 11B. FIGS. 11A and 11B are flowcharts illustrating an operation performed in the photographing apparatus 100, according to an embodiment of the present invention.

If the shutter button 135a, which is an example of the operating member 135, is half-pressed by a user and a focus control operation using the contrast method is initiated, in operation S101, it is determined whether an AF auxiliary light is necessary according to a luminance of a subject image.

The initiation of the focus control operation by half-pressing the shutter button 135a, which is an example of the operating member 135, may generate a first control signal to perform a first drive of the focus lens 104. A second drive of the focus lens 104 is performed after performing the first drive. The first control signal used to control the focus lens 104 to perform the first drive and the second drive may be generated by half-pressing the shutter button 135*a*. The first drive and the second drive of the focus lens 104 will be described in more detail below.

If it is determined that the AF auxiliary light is necessary, in operation S102, an AF auxiliary light emitting unit used to perform the first drive of the focus control operation is determined based on a focal distance or a scene mode of the optical image forming system 101. For example, the red LEDs 132R, the green LEDs 132G, and the blue LEDs 132B that emit light are selected in operation S103 or duty ratios of light emitting pulses of the red LEDs 132R, the green LEDs 132G, and the blue LEDs 132B are determined in operation S104.

The focus lens 104 is moved to an initial driving position initiation position in operation S105, AF auxiliary light emitting for the first drive is initiated in operation S106, and the first drive of the focus control operation is performed in operation S107. When the first drive is completed, the AF auxiliary light for the first drive is turned off in operation S108.

An AF auxiliary light emitting unit for the second drive is determined based on an AF detection value, an AE evaluation value, or an AWB evaluation value obtained in the first drive in operation S109. For example, the red LEDs 132R, the green LEDs 132G, and the blue LEDs 132B that emit light are selected in operation S110 or duty ratios of light emitting pulses of the red LEDs 132R, the green LEDs 132G, and the blue LEDs 132B are determined in operation S111.

The focus lens 104 is moved to a second driving position initiation position in operation S112, AF auxiliary light emitting for the second drive is initiated in operation S113, and the second drive is performed in operation S114. When the second drive is completed, the AF auxiliary light for the second drive is turned off in operation S115. The focus lens 104 is moved to a focusing position, a photographing initiation standby status starts, and the focus control operation using the contrast method is completed in operation S116.

Although the case where it is determined that the AF auxiliary light is necessary is described in the present embodiment, if it is determined that the AF auxiliary light is unnecessary, operations S121 through S125 are performed as shown in FIG. 10A. The focus lens 104 is moved to an initial driving position initiation position in operation S121. The first drive of the focus control operation is performed in operation S122. The focus lens 104 is moved to a second driving position initiation position in operation S123. The second drive of the focus control operation is performed in operation S124. The focus lens 104 is moved to a focusing position, a photographing initiation standby status starts, and the focus control operation using the contrast method is completed in operation S125.

Although not shown, after the focus control operation is completed, i.e., by or after moving the focus lens 104 to the focusing position, an input subject image can be captured by pressing the shutter button 135*a* all the way. In this regard, the captured image may be compressed by performing a predetermined image signal process and may be stored as an image file. The shutter button 135*a* that is an example of the operating member 135 may further generate a second control signal used to control the input subject image to be captured by moving the focusing lens 104 to the focusing position. The shutter button 135*a* is used to generate the first and second control signals by being pressed halfway or all the way and is a part of the operating member 135 that can efficiently capture a focused subject image after the focus control operation is completed.

Figure 12:
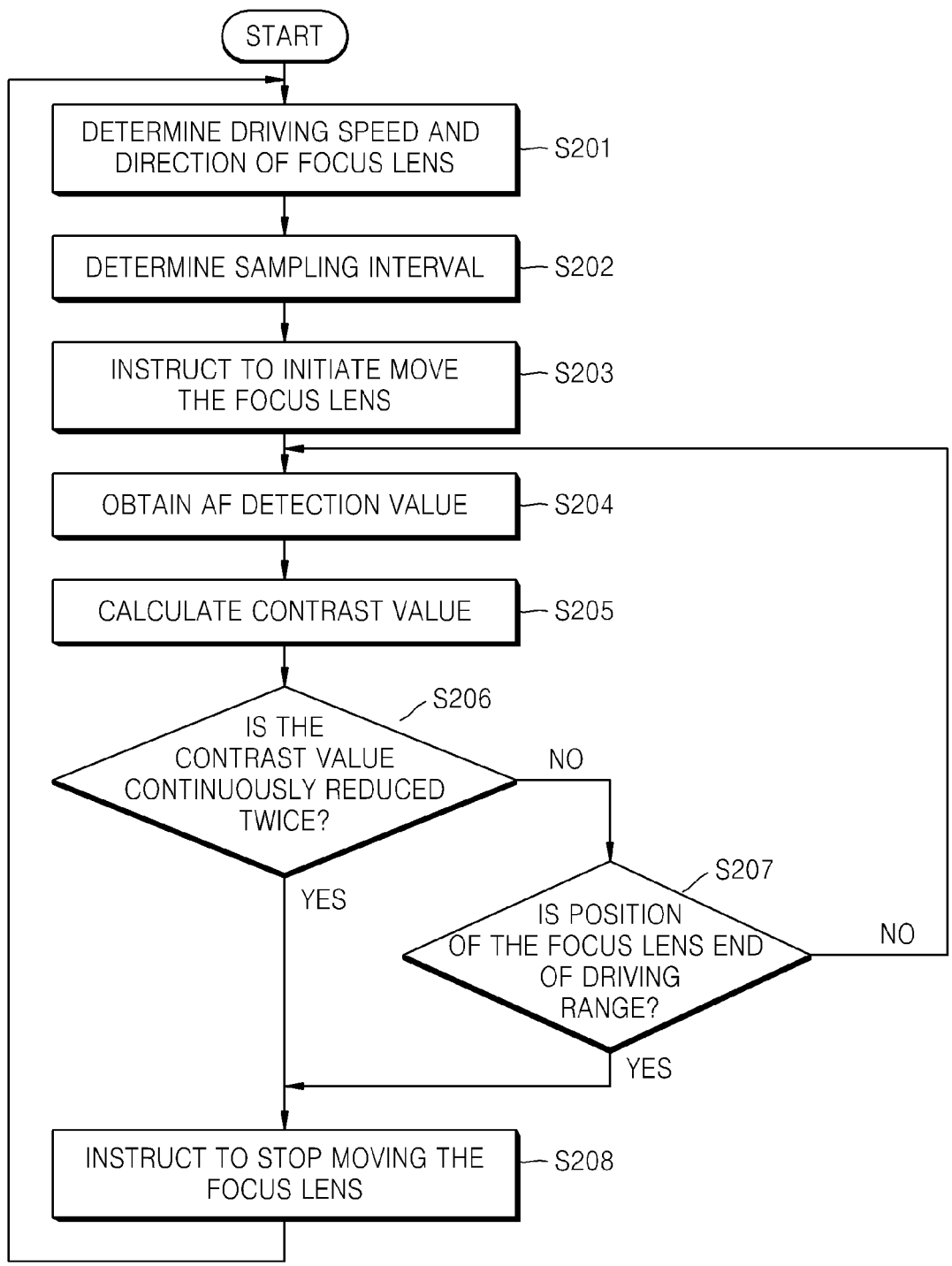
FIG. 12 is a flowchart illustrating an operation of driving a focus lens during focus control performed by a photographing apparatus, according to an embodiment of the present invention.

The operation of driving the focus lens 104 during focus control performed by the photographing apparatus 100 will now be described. FIG. 12 is a flowchart illustrating an operation of driving a focus lens during focus control performed by a photographing apparatus, according to an embodiment of the present invention.

A driving speed and direction of the focus lens 104 are determined within a driving range of the focus lens 104 according to a first drive or a second drive in operation S201. A sampling interval is determined according to the first drive or the second drive in operation S201. It is instructed to perform movement initiation of the focus lens 104 and thus the movement of the focus lens 104 is initiated in operation S203.

An AF detection value is obtained in operation S204 and contrast values are calculated in operation S205 while the focus lens 104 moves. As described above, when the contrast value is continuously reduced twice in operation S206, since a peak value of the contrast values is nearby, it is instructed to perform a movement stop of the focus lens 104 and thus the movement of the focus lens 104 is stopped in operation S208. However, when the contrast value does not sequentially drop twice, it is determined whether the position of the focus lens 104 reaches an end of the driving range in operation S207. When the contrast value does not sequentially drop twice and it is determined that the position of the focus lens 104 does not reach the end of the driving range, the focus lens 104 continuously moves and the AF detection value is obtained in operation S204. Thereafter, operations S205 and S206 are performed again.

In order to detect the contrast values of the subject image during focus control, when a luminance of the subject is low, it is impossible to detect a sufficient amount of image signal information. Thus, the photographing apparatus 100 illuminates an AF auxiliary light to the subject. The photographing apparatus 100 including the light emitting unit 132 having the red LEDs 132R, the green LEDs 132G, and the blue LEDs 132B may illuminate a light or function as the AF auxiliary light.

However, if a distance between the photographing apparatus 100 and the subject is short and a quantity of the AF auxiliary light is great, since an image signal is saturated, it is risky to increase the quantity of the AF auxiliary light. The AF auxiliary light may have a low luminance in order to reduce power consumption. Also, the focus control operation using a contrast method needs lighting throughout a scanning operation and thus it is important to reduce power consumption. Meanwhile, if the distance between the photographing apparatus 100 and the subject is long and the quantity of the AF auxiliary light is insufficient, it is impossible to obtain sufficient contrast information. Thus, it is required to control the optimal quantity of the AF auxiliary light.

The light emitting unit 132 having the red LEDs 132R, the green LEDs 132G, and the blue LEDs 132B is used as an auxiliary light of a camera of a mobile phone according to a high luminance LED and a low-priced blue (white) LED. The light emitting unit 132 having the red LEDs 132R, the green LEDs 132G, and the blue LEDs 132B is expected to be a replacement of a xenon (Xe) tube as a strobe light of a digital camera if high luminance and low power consumption are realized in the near future.

The light emitting unit 132 having the red LEDs 132R, the green LEDs 132G, and the blue LEDs 132B may be used as a light emitting unit (an illuminating unit) by collecting a plurality of LEDs. LEDs are divided into three colors (RGB) and quantities thereof are separately controlled and thus a light emitting color that is difficult to realize in the Xe tube can match an environmental light. The light emitting unit 132 having the red LEDs 132R, the green LEDs 132G, and the blue LEDs 132B may be used as an AF auxiliary light that illuminates a subject at low illumination.

The focus control operation using the contrast method detects a peak of contrast values of a captured subject according to the driving of the focus lens 104 and a peak position is consistent with a focusing position. Thus, a reduction in the driving time of the focus lens 104 makes it possible to easily operate the photographing apparatus 100. In order to reduce the driving time of the focus lens 104, the first drive (sampling intervals are sparse) for driving the focus lens 104 at high speed and determining whether a peak is detected is performed. In order to detect a high precision peak position, a precise sampling operation is performed and the second drive for driving the focus lens 104 is performed. The focus control is performed in the second operation in the present embodiment. In this regard, the second drive may be designed to have a shorter control period than the first drive.

The photographing apparatus 100 of the present embodiment controls an AF auxiliary light that prioritizes a reduction in power consumption in the first drive and controls an optimal quantity of light that prioritizes an AF precision in the second drive. For example, an LED method used in the second drive is determined based on a reflection quantity of light or contrast values of a subject obtained in the first drive. The LED method reduces or increases an accumulated quantity of light during an exposure period by changing a duty ratio of a light emitting pulse, or reduces or increases the number of LEDs. Also, positions of LEDs may be changed or LEDs having different wavelengths may be changed or combined.

The photographing apparatus 100 of the present embodiment performs a light emitting control operation of the light emitting unit 132, thereby increasing an AF precision in a scene having a low illumination. The photographing apparatus 100 of the present embodiment can efficiently utilize resources of the imaging device 100 included in the light emitting unit 132 having the red LEDs 132R, the green LEDs 132G, and the blue LEDs 132B. A person, i.e., a subject, can be informed of a drive change from the first drive to the second drive by changing the light emitting positions of the red LEDs 132R, the green LEDs 132G, and the blue LEDs 132B, and thus the person can be informed that photographing is instantly performed.

Although a focus control operation is performed using a contrast method in the above-described embodiments, a phase difference method can also be applied to the present invention. That is, when a plurality of drives, such as a first drive and a second drive, are performed during the focus control operation using the phase difference method, a light emitting unit can be controlled to perform different light emitting according to each drive. Thus, the light emitting varies according to a drive mode during the focus control operation while a high precision focusing position is detected, thereby reducing power consumption.

The present invention can reduce power consumption by detecting a focusing position at high precision and controlling light emission according to a driving mode when performing focus control.

The device described herein may comprise a processor, a memory for storing program data and executing it, a permanent storage such as a disk drive, a communications port for handling communications with external devices, and user interface devices, etc. Any processes may be implemented as software modules or algorithms, and may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A photographing apparatus comprising:
a focus lens that moves in an optical axis direction and focuses a subject image on an imaging surface;
a photoelectric conversion device comprising the imaging surface and that converts the subject image formed on the imaging surface into an electric signal;
a focusing position detector for detecting a focusing position of the focus lens when at least one main subject image of the subject image is focused on the imaging surface;
a focus control unit for controlling
a first drive of the focus lens to focus the subject image on the imaging surface at a first time, wherein the focus control unit moves the focus lens in a wide sampling interval to determine the at least one main subject image; and
a second drive of the focus lens that is different from the first drive to focus the subject image on the imaging surface at a second time after the first time, wherein the focus control unit moves the focus lens in a narrow sampling interval within a range corresponding to the main subject image determined in the first drive and detects the focusing position during the second drive of the focus lens;
a light emitting unit for emitting a light on a subject; and
a light emitting control unit for controlling the light emitting unit to have a greater light emission during the second drive than during the first drive.

2. The photographing apparatus of claim 1, further comprising:
a contrast value calculating unit for calculating a contrast value in an image signal, that is based on the electric signal, in at least one region of the imaging surface during focus control; and
a main subject image determining unit for determining the at least one main subject image based on the contrast value,
wherein the focusing position detector detects a position of the focus lens corresponding to a peak value of the contrast value as the focusing position, and
the focus control unit controls the first drive of the focus lens that determines the at least one main subject image and controls the second drive of the focus lens that drives the focus lens within a range including the peak value of the contrast value corresponding to the main subject image determined in the first drive and detects the focusing position.

3. The photographing apparatus of claim 1, wherein the first drive and the second drive of the focus lens have different driving speeds.

4. The photographing apparatus of claim 1, wherein the light emitting control unit controls the light emitting unit to have a greater duty ratio of a light emitting pulse in the second drive than in the first drive.

5. The photographing apparatus of claim 1, wherein the light emitting unit comprises a plurality of light emitting diodes (LEDs).

6. The photographing apparatus of claim 5, wherein the light emitting control unit controls the light emitting unit to have a greater number of active LEDs in the second drive than in the first drive.

7. The photographing apparatus of claim 5, wherein the light emitting unit comprises a plurality of LEDs having different wavelengths, and the light emitting control unit controls the light emitting unit to emit light closer to a main color of the at least one main subject image during the second drive than in the first drive.

8. The photographing apparatus of claim 5, wherein the light emitting control unit selects at least one LED to emit light in the light emitting unit according to a position of the at least one main subject image during the second drive.

9. The photographing apparatus of claim 1, wherein the light emitting control unit controls the light emitting unit to emit light on the subject during a photographing operation.

10. The photographing apparatus of claim 1, further comprising:
an operating member for generating a first control signal used to control the first drive and the second drive of the focus lens, and further for generating a second control signal used to capture an input subject image by moving the focus lens to the focusing position.

11. A photographing method comprising:
performing a first drive on a focus lens at a first time and determining at least one main subject image by moving the focus lens in a wide sampling interval to detect a peak value of a contrast value corresponding to an image signal in the at least one main subject image;
emitting light from a light emitting unit that emits a light during the first drive of the focus lens;
performing a second drive on the focus lens at a second time after the first time, determining a focusing position by moving the focus lens in a narrow sampling interval within a range including the peak value of the contrast value, and detecting a focusing position of the focus lens when the at least one main subject image is focused on an imaging surface; and
controlling the light emitting unit to have a greater light emission during the second drive than during the first drive of the focus lens.

12. The photographing method of claim 11, wherein the first drive and the second drive of the focus lens have different driving speeds.

13. The photographing method of claim 11, wherein the light emitting unit has a greater duty ratio of a light emitting pulse in the second drive than in the first drive.

14. The photographing method of claim 11, wherein the light emitting unit includes a plurality of LEDs, the method further comprising:
controlling, by a light emitting control unit, the light emitting unit in the second drive to have a greater number of active LEDs in use than in the first drive.

15. The photographing method of claim 11, wherein the light emitting unit includes a plurality of LEDs having different wavelengths, the method further comprising:
controlling, by a light emitting control unit, the light emitting unit to emit light closer to a main color of the at least one main subject image during the second drive than in the first drive.

16. The photographing method of claim 11, wherein the light emitting unit includes a plurality of LEDs having different wavelengths, further comprising:

selecting, by a light emitting control unit, at least one LED that emits light in the light emitting unit according to a position of a screen of the at least one main subject image during the second drive.

17. A computer program product, comprising a non-transitory computer usable medium having a computer readable program code embodied therein, said computer readable program code adapted to be executed to implement a photographing method, said method comprising:

performing a first drive on a focus lens at a first time and determining at least one main subject image by moving the focus lens in a wide sampling interval to detect a peak value of a contrast value corresponding to an image signal in the at least one main subject image;

emitting light from a light emitting unit that emits a light onto a subject during the first drive of the focus lens;

performing a second drive on the focus lens at a second time after a first time, determining a focusing position by moving the focus lens in a narrow sampling interval within a range including the peak value of the contrast value, and detecting a focusing position of the focus lens when the main subject image is focused on an imaging surface; and controlling the light emitting unit to have a greater light emission during the second drive than during the first drive of the focus lens.

\* \* \* \* \*

UNITED STATES PATENT AND TRADEMARK OFFICE
CERTIFICATE OF CORRECTION

PATENT NO. : 8,446,518 B2
APPLICATION NO. : 12/624629
DATED : May 21, 2013
INVENTOR(S) : Toshiyuki Tanaka Page 1 of 1

It is certified that error appears in the above-identified patent and that said Letters Patent is hereby corrected as shown below:

IN THE CLAIMS:

In Claim 16, Column 19, line 3, replace "subiect" with

--subject--

Signed and Sealed this
Twentieth Day of August, 2013

Teresa Stanek Rea
*Acting Director of the United States Patent and Trademark Office*